United States Patent [19]

Kobayashi et al.

[11] 4,267,155
[45] May 12, 1981

[54] PROCESS FOR CLEANING FLUE GAS

[75] Inventors: Yoshio Kobayashi, Yokohama; Kōichi Andō, Chigasaki; Susumu Hyodō, Hiratsuka, all of Japan

[73] Assignee: Mitsubishi Kakoki Kaisha Ltd., Toyko, Japan

[21] Appl. No.: 67,772

[22] Filed: Aug. 20, 1979

[51] Int. Cl.³ .............................................. B01D 53/34
[52] U.S. Cl. .................................. 423/235; 423/242; 423/243; 423/542
[58] Field of Search ................... 423/235, 542, 242 A, 423/242 R, 243

[56] References Cited

U.S. PATENT DOCUMENTS

| | | | |
|---|---|---|---|
| 4,044,101 | 1/1977 | Hisamatsu et al. | 423/235 |
| 4,186,176 | 1/1980 | Kitamura et al. | 423/235 |

Primary Examiner—Earl C. Thomas
Attorney, Agent, or Firm—Oblon, Fisher, Spivak, McClelland & Maier

[57] ABSTRACT

A flue gas containing $SO_x$, $NO_x$ and $O_2$ is washed with an alkaline aqueous solution containing a $NO_x$ removal catalyst to form the salts of a dithionate, a sulfate and an imidobissulfate. The salts are crystallized, separated and heated for pyrolysis by a pneumatic conveying pyrolysis unit whereby a gas containing higher concentration of $SO_2$ is obtained. The gas is fed into the alkaline aqueous solution together with the flue gas so as to improve the efficiency.

5 Claims, 1 Drawing Figure

PROCESS FOR CLEANING FLUE GAS

BACKGROUND OF THE INVENTION

1. Field of the Invention

The present invention relates to a process for cleaning a flue gas containing $SO_x$, $NO_x$ and $O_2$ by washing it with an alkaline aqueous solution containing a $NO_x$ removal catalyst.

2. Description of the Prior Art

When the flue gas containing $SO_x$, $NO_x$ and $O_2$ is washed with an alkaline aqueous solution containing a $NO_x$ removal catalyst, an oxidation is caused as well as the $SO_x$ removal and the $NO_x$ removal to obtain a by-product containing a dithionate, a sulfate and an imidobissulfate as main components.

The main reactions resulting in the simultaneous $SO_x$ removal and $NO_x$ removal by using a base are as follows: The base include hydroxides or carbonates of potassium, sodium, magnesium, calcium or ammonium.

$SO_x$ removal $$H_2O + SO_2 \rightarrow SO_3^{2-} + 2H^+$$

$NO_x$ removal $$5SO_3^{2-} + 2NO + 3H_2O \rightarrow SO_4^{2-} + 2NH(SO_3)_2^{2-} + 4OH^-.$$

In said reactions, 2.5 mol. of sulfite ($SO_3^{2-}$) is required to absorb 1 mol. of NO gas.

On the other hand, most of the sulfite produced by absorbing $SO_2$ from the flue gas is converted into polythionates such as $S_2O_6^{2-}$ and $S_nO_6^{2-}$ by an oxidation with $O_2$ gas in the flue gas or a side reaction in the washing solution.

A large amount of dithionates is produced as the main oxidized products by the following reaction in the presence of a Fe catalyst.

$$\text{Chelate Fe(II)} + \tfrac{1}{4}O_2 + \tfrac{1}{2}H_2O \rightarrow \text{Chelate Fe(III)} + OH^-$$

$$\text{Chelate Fe(III)} + SO_3^{2-} \rightarrow \text{Chelate Fe(II)} + \tfrac{1}{2}S_2O_6^{2-}.$$

Two mol. of a dithionate is produced by the reaction of 1 mol. of $O_2$ with consumption of 4 mol. of sulfite ($SO_3^{2-}$).

(All of $O_2$ is not always reacted, but only some of $O_2$ is reacted.)

When the flue gas containing 3 to 3.5 vol.% of $O_2$, 1600 ppm of $SO_2$ and 280 to 300 ppm of NO was washed with an alkaline aqueous solution as the absorbent to absorb 80 to 90% of NO, a consumption of the sulfite for producing the dithionate is ranging from 4.5 to 6.5 mol. during absorbing 1 mol. of NO. This is only one example. Such large consumption of $SO_3^{2-}$ is found. The consumption of the sulfite caused by the production of the dithionate is depending upon a concentration of $O_2$ in the flue gas, a $NO_x$ removal efficiency and catalytic characteristics in a $NO_x$ removal absorbent solution.

Even though a molar ratio of $SO_2/NO$ is 5.5, the shortage of the sulfite for the $NO_x$ removal is caused, that is, the amount of $SO_2$ to the amount of $NO_x$ is not enough whereby a desired $NO_x$ removal rate has not been attained. In order to overcome the shortage of $SO_2$ gas, it has been proposed to add a strong acid to an aqueous solution containing the dithionate and the polythionate and then to heat it at high temperature so as to obtain $SO_2$ gas as the decomposed product.

In this process, a large amount of a strong acid should be used at high temperature under high pressure for a long time to cause serious problem for selection of material for the apparatus. Moreover, in order to treat excess of the acid, a complicated and disadvantageous operation such as excess acid neutralization with a base has been required.

As a result, the consumptions of the acid and the base are obliged to increase and the formation of a large amount of valueless products such as gypsum, ammonium sulfate and sodium sulfate are disadvantageously increased.

SUMMARY OF THE INVENTION

It is an object of the present invention to provide a process for cleaning a flue gas which minimizes a consumption of a base and an acid without a complicated step.

Another object of the present invention is to improve a shortage of $SO_2$ gas in a process for cleaning of an flue gas by washing the flue gas containing $SO_x$, $NO_x$ and $O_2$ with an alkaline aqueous solution containing a $NO_x$ removal catalyst.

The foregoing and other objects of the present invention have been attained by separating a dithionate ($S_2O_6^{2-}$), a pyrosulfite ($S_2O_5^{2-}$), and an imidobissulfate ($NH(SO_3)_2^{2-}$) as their crystals and carrying out the pyrolysis of the crystals at a temperature higher than a pyrolysis temperature of the dithionate, but lower than a pyrolysis temperature of the imidobissulfate to form $SO_2$ gas and absorbing the resulting $SO_2$ gas into the washing solution so as to effectively utilize $SO_2$ gas in the $NO_x$ removal.

DETAILED DESCRIPTION OF THE PREFERRED EMBODIMENTS

Figure 1:
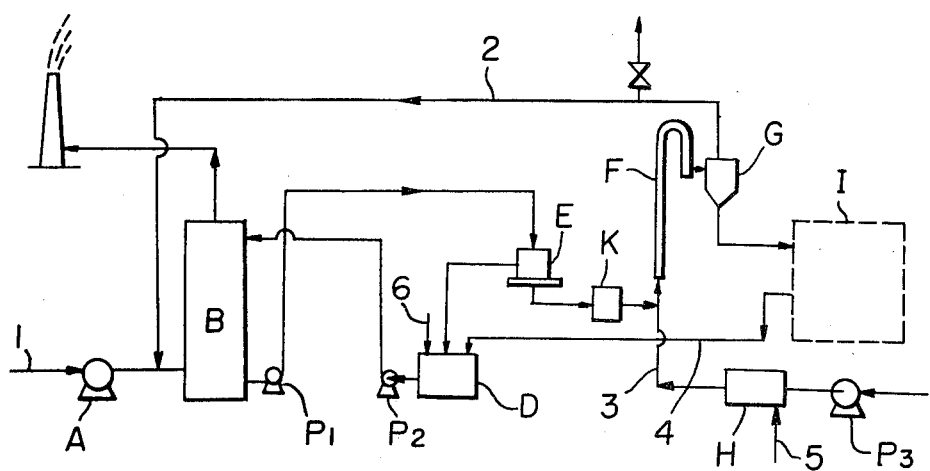
FIG. 1 is a block diagram of the system of Example 1.
A: flue gas blower;
B: absorption tower;
D: tank for absorbent solution;
E: separator;
F: pyrolysis tube
G: cyclone;
H: hot gas generator;
I: regeneration subsystem;
K: solid feeder;
P1: separator feed pump;
P2: absorption tower feed pump;
P3: fuel pump;
1: flue gas;
2: recovered $SO_2$ gas;
3: hot gas for pyrolysis;
4: recovered alkaline solution;
5: air;
6: additional alkali sulfite

The present invention has been attained by various studies on the improvement of shortage of $SO_2$ gas.

The crystals obtained by the $NO_x$ removal such as the dithionate, the pyrosulfite, the imidobissulfate, the polythionate and the sulfate are brought into contact with a hot gas so as to result the pyrolysis of the crystals by the following reactions. The resulting $SO_2$ gas is recycled to the $NO_x$ absorbing system so as to be absorbed.

$$S_2O_6{}^{2-} \rightarrow SO_4{}^{2-} + SO_2 \uparrow$$

$$3S_2O_5{}^{2-} \rightarrow 2SO_4{}^{2-} + S_2O_3{}^{2-} + 2SO_2 \uparrow$$

or $$S_2O_5{}^{2-} \rightarrow SO_3{}^{2-} + SO_2 \uparrow$$

$$3NH(SO_3)_2{}^{2-} \rightarrow 3SO_4{}^{2-} + NH_3 + N_2 + 3SO_2 \uparrow$$

The pyrolysis of the dithionate, the pyrosulfite and the imidobissulfate are respectively caused at 280° to 320° C.; 150° to 220° C. and 380° to 450° C. When the pyrolysis is carried out at a temperature higher than the pyrolysis temperature of the imidobissulfate, $NH_3$ gas is generated together with $SO_2$ gas. When the gas containing $NH_3$ gas is recycled into the absorbing system, the ammonium salt, complicated compounds between $SO_2$ and $NH_3$ gas are accumulated in the absorbing system, disadvantageously. As a result, it is obliged to discharge it as a waste solution from the system. In order to prevent such disadvantage, the imidobissulfate is fed without performing the pyrolysis of the imidobissulfate in the pyrolysis step, into the next reducing step wherein it is decomposed into non-toxic $N_2$ and sulfide by the following reaction.

$$NH(SO_3K)_2 + 6.5\ H_2 \rightarrow \tfrac{1}{2}N_2 + K_2S + H_2S + 6H_2O$$

When the crystals are brought into contact with the hot gas to maintain the temperature being higher than the pyrolysis temperature of the dithionate and lower than the pyrolysis temperature of the imidobissulfate, the pyrolysis of the sulfite, the dithionate and the polythionate is caused within several seconds so as to form $SO_2$ gas by the above-mentioned reaction, and to form a porous solid product. The gas containing $SO_2$ gas and the porous solid product are fed into a conventional dust separator such as a cyclone to separate the dust and to recover $SO_2$ gas. The $SO_2$ gas is supplied into the absorption tower.

The solid product obtained by the pyrolysis (main components of the sulfate and the imidobissulfate) is porous whereby the sulfate is easily reduced through its sulfide into its carbonate when it is treated in a reducing atmosphere at high temperature. The salts are heated to high temperature by the pyrolysis whereby the thermal efficiency of the reducing unit is further improved.

In order to carry out the reducing step in high thermal efficiency, the temperature in the pyrolysis step is preferably higher. However, when it is too high, $NH_3$ gas is generated as the pyrolysis of the imidobissulfate is also caused. Therefore, it is important to carry out the pyrolysis at the temperature limited to the narrow range.

A conventional rotary kiln and a fluidized bed unit are usually used for a pyrolysis. However, when such kiln or a fluidized bed is used, it is difficult to prevent the pyrolysis of the imidobissulfate in the operation for maintaining the solid temperature in the range of 370° to 380° C. because of local high temperature. However, when a pneumatic conveying pyrolysis unit is used, the pyrolysis step can be performed without the pyrolysis of imidobissulfate and in high thermal efficiency.

As it is unusual for pneumatic conveying unit to be employed for pyrolysis treatment, the detail of the pneumatic conveying pyrolysis unit is illustrated in the following.

The pneumatic conveying pyrolysis unit is designed so as to operate the pneumatic conveying dryer at the pyrolysis temperature, and has a remarkably simple system including a hot gas generator H, a solid feeder K, a pyrolysis tube F and a cyclone G as shown in FIG. 1.

In the pneumatic conveying pyrolysis unit, the solid component which is dehydrated by a centrifugal separator is co-currently fed into the pyrolysis tube F together with the hot gas. The pyrolysis of the solid component should be resulted in the pyrolysis tube F and the resulting solid product should be discharged together with the hot gas. The flow rate of the gas should be enough to pass the solid component out of the pyrolysis tube F. The flow rate is usually in a range of 10 to 50 m/sec. In the cyclone G, the resulting solid product is separated from the exhaust gas. The temperature of the hot gas is controlled to heat the solid component to about 370° to 380° C. at the outlet of the pyrolysis tube F. The temperature of the exhaust gas is slightly higher than the temperature of the solid product (about 5° to 50° C. higher) at the outlet of the pyrolysis tube F. The pyrolysis tube F can be set in any direction. The solid component and the hot gas are not fed from the top to the bottom of the pyrolysis tube F. The pyrolysis tube F is usually not heated by an outer heater and it is usually heated by only the hot gas. The important factor of the pyrolysis tube F is to give a short resident time of 0.05 to 10 seconds preferably 0.5 to 5 seconds. The pneumatic conveying pyrolysis unit imparts excellent pyrolysis because of the co-current contact of the hot gas and the solid component with high heat transfer coefficient.

The bases used for the preparation of the alkaline aqueous solution include hydroxides and carbonates of potassium, sodium, magnesium, calcium and ammonium. The solubility of ammonium dithionate is high so that it is difficult to precipitate crystals by cooling the solution. In such case, the washed solution is concentrated to obtain the crystals which are treated in the pyrolysis step. It is especially effective to apply the process of the present invention to a potassium salt system in which the solubility of the product in the $NO_x$ removal is remarkably low so as to easily separate the product as its crystals.

The process of the present invention will be illustrated in detail referring to the block diagram for the process using potassium salts.

In FIG. 1, a flue gas (1) is pressurized by an flue gas blower A and is fed to the bottom of an absorption tower B. On the other hand, an absorbent solution ($K_2S_2O_6$—$NH(SO_3K)_2$—$K_2SO_3$—$K_2S_2O_5$—$K_2SO_4$—$H_2O$—catalyst) stored in a tank D is fed to the top of the absorption tower by a pump P2 at a constant rate. The $SO_x$ removal and the oxidization are resulted in the absorption tower B to form $K_2S_2O_6$, $K_2SO_4$, $K_2S_2O_5$, $K_2S_4O_6$, $NH(SO_2K)_2$ and potassium polythionates. The temperature in the absorption tower B is maintained at 55° to 60° C. Therefore, the products are crystallized. A slurry of the absorbed solution containing the crystals is discharged from the bottom by a pump P1 and the crystals are separated by a separator E. The filtrate is stored in the tank D for the absorbing solution and is recycled as the absorbing solution.

On the other hand, the crystals separated by the separator E is fed into pneumatic conveying pyrolysis unit wherein the crystals are brought into contact with a hot gas (3) (mixed gas containing $N_2$, $CO_2$ and $H_2O$ at 350° to 600° C.) fed from a hot gas generator H, so as to result the pyrolysis. A solid gas separation is carried out in a cyclone after the pyrolysis. The gas (2) containing the $SO_2$ gas formed by the pyrolysis is fed into the absorption tower B wherein the gas-liquid reaction is performed with the absorbing solution to form the sulfite ($K_2SO_3$) to be remarkably effective for the $NO_x$ removal.

The gas containing $SO_2$ obtained by the pyrolysis can be washed with an aqueous solution of a base by employing a different scrubber not shown in FIG. 1.

The minimum limit of the pyrolysis temperature in the pneumatic conveying pyrolysis unit is depending upon the amount of the necessary $SO_2$ in the absorbing system and it is usually higher than 300° C. preferably higher than 370° C. The maximum temperature should be set to lower than 400° C.

The contact between the hot gas and the crystals can be a multi-step contact system in which the crystals are dried and preheated by the residual heat of generated pyrolysis gas.

On the other hand, the solid product (main components of $K_2SO_4$ and $NH(SO_3K)_2$) separated by the cyclone G is fed into a regeneration subsystem I.

When the solid product which is obtained by the pyrolysis in the pneumatic conveying pyrolysis unit is treated by the reductive regeneration, the reduction of the solid product is easily attained because the dithionate and the pyrosulfite are converted into the corresponding sulfate or sulfite in the pyrolysis prior to the reducing treatment. The sulfate and sulfite are easily reduced into the corresponding sulfide and the sulfide is easily carbonated to obtain alkali carbonates. The product can be used as a base. Accordingly, the solid product separated by the cyclone G is recovered as the recovered base ($K_2CO_3$ and $KHCO_3$)(4). The solution can be reused as the absorbent solution in the flue gas $SO_x$ and $NO_x$ removal treatment.

In the reducing treatment, the porous solid product from cyclone G is pulverized to be fine particles (average diameter of 10μ) and the fine powder is dispersed into the reducing gas flow heated at high temperature, and then, the temperature is maintained at 700° to 1000° C. for 0.5 to 2.0 seconds. Accordingly, the fine powder of $K_2SO_4$ etc. can be converted into $K_2S$, $K_2CO_3$, ($KHCO_3$), $H_2S$, $H_2O$ and $N_2$. In the operation, the solid component is porous whereby the reaction with the reducing gas at high temperature is further accelerated.

The gas discharged from the reducing unit comprises $H_2$, $CO$, $CO_2$, $N_2$, $H_2S$ and $H_2O$. After separating $H_2S$ from the off gas, a combustion of the gas can be carried out with air (5) in the hot gas generator H shown in FIG. 1. so as the hot gas utilized for the pyrolysis of the crystals such as the dithionate.

The effect of the present invention is illustrated in the following.

(1) In the method of recovering $SO_2$ gas from the dithionate, the polythionate and the pyrosulfite formed in the absorption tower, the pyrolysis of the imidobissulfate can be prevented by employing the pneumatic conveying pyrolysis unit, and the object salts can be selectively decomposed by the pyrolysis in high efficiency for a short time and only simple post-treatment is required.

(2) A desired $NO_x$ removal efficiency is attained by recovering $SO_2$ gas by the pyrolysis even though the shortage of the amount of $SO_2$ to the amount of $NO_x$ in the flue gas is found.

(3) The base in the absorbing solution can be recovered by the reducing and carbonating treatment of the solid product obtained by the pyrolysis of the dithionate, the polythionate and the pyrosulfite. The solid product is porous and has desired components for the reducing and carbonating treatment.

The present invention will be further illustrated by certain examples which are provided for purposes of illustration only and are not intended to be limiting the present invention.

EXAMPLE 1

In FIG. 1, a boiler flue gas (930 ppm of $SO_2$, 300 ppm of $NO_x$, 4.5 vol.% of $O_2$) was induced from a flue gas duct by a flue gas blower A at a rate of 520 $Nm.^3$/hour and fed into an absorption tower B. The absorption tower B is a movable perforated plate scrubber (inner diameter of 300 mm). The flue gas and the gas containing higher concentration of $SO_2$ obtained by the pyrolysis were fed into the bottom of the tower and an absorbent solution was fed from the top of the tower so as to contact them on the perforated plates whereby the $SO_x$ removal and the $NO_x$ removal were carried out.

The absorbent solution containing 1.8(wt)% of $K_2SO_3$, 1.4(wt)% of $K_2S_2O_5$, 8.2(wt)% of $K_2S_2O_6$, 5.8(wt)% of $K_2SO_4$, 1.5(wt)% of $NH(SO_3K)_2$, 0.1 mol./liter of EDTA.Fe was fed at a rate of 1300 kg./hour by a pump P2 from the top of the tower. After the absorption, the solution was fed by the pump P1 into a separator E(basket type centrifugal separator) wherein crystals were separated to obtain a filter cake containing 9.1(wt)% of $K_2SO_4$, 16.5(wt)% of $NH(SO_3K)_2$, 66.5(wt)% of $K_2S_2O_6$ and 7.9(wt)% of $H_2O$ at a rate of 9.6 kg./hour.

After the separation of the crystals, the filtrate was returned into a storage tank D as the absorbent solution wherein $K_2SO_3$ and $KHCO_3$ were respectively added at rates of 3.2 kg./hour and 3.0 kg./hour through pipes (6) and they are mixed to reuse it as the absorbent solution.

The crystals were fed through a feeder K into a pyrolysis tube F at a constant rate of 9.6 kg./hour. The gas (12 vol.% of $H_2O$, 12 vol.% of $CO_2$, 1 vol.% of $O_2$ and 75 vol.% of $N_2$) heated at 550° C., was fed at a rate of 29 $Nm.^3$/hour with the crystals whereby the pyrolysis was caused to form $SO_2$ gas. The solid product and the gas containing higher concentration of $SO_2$ which were obtained by the pyrolysis were fed into a cyclone G wherein the solid product containing 77.8(wt)% of $K_2SO_4$ and 22.2(wt)% of $NH(SO_3K)_2$ was separated at a rate of 7.1 kg./hour.

The temperature of the solid product recovered from the cyclone G was about 375° C. and a decomposition efficiency of $K_2S_2O_6$ was about 100% whereas $NH(SO_3K)_2$ was not substantially decomposed.

The $SO_2$ gas formed by the pyrolysis was at a rate of about 26 mol./hour whereas the $SO_2$ gas in the flue was at a rate of about 22 mol./hour.

The gas containing $SO_2$ gas obtained by the pyrolysis was fed from the bottom of the absorption tower B.

$SO_2$ concentration and $NO_x$ concentration at the outlet of the absorption tower were respectively measured by an Infrared spectrography $SO_2$ analyzer and a vacuum type photochemical $NO_x$ analyzer. The results are as follows:

$SO_2$: 0 ppm; $NO_x$: 30 ppm (dry gas)

Accordingly, the removal rates of $SO_2$ and $NO_x$ are respectively 100% and 90% by the calculation from the concentrations in the boiler flue gas fed into the absorption tower.

EXAMPLE 2

In accordance with the process of Example 1 except employing a fluidized bed pyrolysis unit instead of the pneumatic conveying pyrolysis unit, the test was carried out. A filter cake containing 9.2 (wt)% of $K_2SO_4$, 16.7(wt)% of $NH(SO_3K)_2$, 66.3(wt)% of $K_2S_2O_6$ and 7.8 (wt)% of $H_2O$ was fed through a feeder into a fluidized bed pyrolysis unit at a constant rate of 9.5 kg./hour. The gas heated at 410° C. was fed at a rate of 26 Nm.$^3$/hour counter-currently to contact with the filter cake so as to form $SO_2$ gas by the pyrolysis. After the pyrolysis, the solid product and the gas were fed into the solid-gas separator to separate them and the solid product containing 78.6(wt)% of $K_2SO_4$, 18.6(wt)% of $NH(SO_3K)_2$ and 2.8(wt)% of $K_2S_2O_6$ was recovered at a rate of 7.0 kg./hour.

The temperature of the solid product recovered from the solid-gas separator was about 370° C. A decomposition efficiency of $K_2S_2O_6$ was 96.8% and a decomposition efficiency of $NH(SO_3K)_2$ was 17.7%. The gas containing $SO_2$ was fed from the bottom of the absorption tower. The removal rates of $SO_2$ and $NO_x$ were respectively >99.5% and 90%. However, the concentration of $NH_4^{1+}$ in the absorbent solution increased at a rate of about 0.1 mol./liter in the operation for 10 days.

What is claimed is:

1. In a process for cleaning a flue gas containing $SO_x$, $NO_x$ and $O_2$ by washing with an alkaline aqueous solution containing a $NO_x$ removal catalyst, wherein a dithionate, a sulfate and an imidobissulfate, formed in said washing step are separated as their crystals, the improvement comprising heating the crystals to a temperature higher than the pyrolysis temperature of the dithionate but lower than the pyrolysis temperatures of the imidobissulfate to form a solid product and a gas containing $SO_2$, separating the gas containing $SO_2$ and feeding it into said alkaline aqueous solution for washing the flue gas whereby the $SO_2$ gas produced by the pyrolysis is effectively utilized for $NO_x$ removal.

2. A process for cleaning a flue gas according to claim 1 wherein said solid product separated after pyrolysis is converted into a base by a reducing treatment with heating at high temperature in a reducing atmosphere and carbonating treatment and said base is used for preparing said alkaline aqueous solution.

3. A process for cleaning a flue gas according to claims 1 or 2, wherein said pyrolysis step is carried out in a pneumatic conveying pyrolysis unit.

4. A process for cleaning a flue gas according to claim 3 wherein the pneumatic conveying pyrolysis unit comprises a pyrolysis tube through which said crystals and a hot gas are concurrently passed at a resident time of 0.05 to 10 seconds.

5. A process for cleaning a flue gas according to claim 3 wherein the pneumatic conveying pyrolysis unit comprises a pyrolysis tube which is heated by a hot gas fed concurrently together with said crystals so as to heat said crystals to 370° to 380° C. at the outlet of said pyrolysis tube.

* * * * *